United States Patent
Hori et al.

(10) Patent No.: US 8,397,372 B2
(45) Date of Patent: Mar. 19, 2013

(54) ELECTRODE WINDING APPARATUS

(75) Inventors: Hideki Hori, Toyota (JP); Kenji Tsuchiya, Toyota (JP); Masataka Takeda, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 218 days.

(21) Appl. No.: 12/812,293

(22) PCT Filed: Dec. 12, 2008

(86) PCT No.: PCT/JP2008/072677
§ 371 (c)(1),
(2), (4) Date: Jul. 9, 2010

(87) PCT Pub. No.: WO2009/087859
PCT Pub. Date: Jul. 16, 2009

(65) Prior Publication Data
US 2010/0281685 A1   Nov. 11, 2010

(30) Foreign Application Priority Data

Jan. 11, 2008   (JP) .................................. 2008-004114

(51) Int. Cl.
*H01F 7/06*   (2006.01)

(52) U.S. Cl. ........... 29/605; 29/602.1; 29/606; 336/212; 336/234

(58) Field of Classification Search ................. 29/602.1, 29/605, 606; 336/212, 234
See application file for complete search history.

(56) References Cited

U.S. PATENT DOCUMENTS

| 4,116,763 | A | * | 9/1978 | Stotz et al. ................... 162/301 |
| 4,516,736 | A | * | 5/1985 | Andersen ...................... 242/523 |
| 4,844,312 | A | * | 7/1989 | Gomi et al. .................... 226/21 |
| 6,026,563 | A | * | 2/2000 | Schilson ........................ 29/825 |
| 2004/0247927 | A1 | * | 12/2004 | Kurz .............................. 428/608 |

FOREIGN PATENT DOCUMENTS

| JP | 5-74446 | 3/1993 |
| JP | 7-268118 | 10/1995 |
| JP | 7-309965 | 11/1995 |

(Continued)

OTHER PUBLICATIONS

International Search Report in International Application No. PCT/JP2008/072677 (Mar. 24, 2009).

(Continued)

*Primary Examiner* — Paul D Kim
(74) *Attorney, Agent, or Firm* — Finnegan, Henderson, Farabow, Garrett & Dunner, LLP

(57) ABSTRACT

An electrode winding apparatus and method of detecting displacement between a strip-shaped electrode and a strip-shaped separator when stacking and winding the strip-shaped electrode and the strip-shaped separator is described. A winding shaft is configured to wind the strip-shaped electrode and the strip-shaped separator, and a guide member is configured to stack the strip-shaped electrode and the strip-shaped separator before the strip-shaped electrode and the strip-shaped separator are wound around the winding shaft. An imaging device is disposed so as to photograph a portion in which the strip-shaped electrode and the strip-shaped separator are stacked between the guide member and the winding shaft from a side on which the strip-shaped separator is stacked. The imaging device is configured to photograph the strip-shaped separator and the strip-shaped electrode through the strip-shaped separator.

7 Claims, 9 Drawing Sheets

FOREIGN PATENT DOCUMENTS

| | | |
|---|---|---|
| JP | 8-134253 | 5/1996 |
| JP | 11-40144 | 2/1999 |
| JP | 2000-182658 | 6/2000 |
| JP | 2000-255847 | 9/2000 |
| JP | 2004-47332 | 2/2004 |
| JP | 2007-141590 | 6/2007 |
| JP | 2007-161474 | 6/2007 |

OTHER PUBLICATIONS

Translation of the International Preliminary Report on Patentability dated Sep. 16, 2010 for PCT/JP2008/072677.

* cited by examiner

ELECTRODE WINDING APPARATUS

TECHNICAL FIELD

The present invention relates to an electrode winding apparatus for stacking and winding a strip-shaped electrode and a strip-shaped separator, and an electrode winding method.

This application is a national phase application of International Application No. PCT/JP2008/072677, filed Dec. 12, 2008, and claims priority from Japanese Patent Application No. 2008-004114, filed on Jan. 11, 2008, the contents of both of which are incorporated by reference in this specification.

BACKGROUND ART

Electrode winding apparatuses for stacking and winding sheet-shaped electrodes and sheet-shaped separators are described, for example, in Japanese Published Unexamined Patent Application Nos. 2007-161474 and 11-40144.

Japanese Published Unexamined Patent Application No. 2007-161474 discloses a winding apparatus for winding positive and negative electrode materials (strip-shaped electrodes) with strip-shaped separators interposed (sandwiched) therebetween. The publication discloses a configuration for detecting an edge of the strip-shaped electrode in a device for correcting meandering of the strip-shaped electrodes. Japanese Published Unexamined Patent Application No. 11-40144 relates to an apparatus for winding a strip-shaped electrode, and it discloses an apparatus that has an edge position detecting means for detecting an edge position of a strip-shaped electrode and corrects the edge position based on the edge position detected by the edge position detecting means. Both of these publications show, in the drawings, a detecting unit extending so as to enclose a widthwise edge portion of the strip-shaped electrode vertically from the outer periphery.

[Patent Reference 1] Japanese Published Unexamined Patent Application No. 2007-161474 (FIG. 2)

[Patent Reference 2] Japanese Published Unexamined Patent Application No. 11-40144 (FIGS. 1 to 3)

DISCLOSURE OF THE INVENTION

When manufacturing a wound electrode body, in which strip-shaped electrodes and strip-shaped separators are stacked and wound, it is desired to wind the strip-shaped electrodes and the strip-shaped separators so as not to be displaced as much as possible. A strip-shaped electrode has a coated portion in which an electrode material is coated. The coated portion is covered with a strip-shaped separator, which is an insulator. If the coated portion sticks out from the strip-shaped separator, an internal short circuit may occur. For this reason, the strip-shaped electrode is stacked so as not to stick out from the strip-shaped separator.

In the above-mentioned Patent References 1 and 2, the edge position detecting means for detecting the edges of the strip-shaped electrode and the strip-shaped separator that are delivered has a detecting unit extending so as to enclose the widthwise edge portions of the strip-shaped electrode and the strip-shaped separator vertically from the outer periphery. However, the detecting units 201 to 204 need to be placed before strip-shaped electrodes 11, 13 and strip-shaped separators 12, 14 are stacked on top of each other because they extend so as to enclose the widthwise edge portions of the strip-shaped electrodes 11, 13 and the strip-shaped separators 12, 14 vertically from the outer periphery, as illustrated in FIG. 4, for example. Accordingly, positions q1 at which the edge position detecting means is disposed are distant from positions q2 at which the strip-shaped electrodes 11, 13 and the strip-shaped separators 12, 14 are actually stacked via guide members 15, 16. There is quite a distance from each of the positions q1 at which the positions of the strip-shaped electrodes and the strip-shaped separators are detected to each of the positions q2 at which they are stacked, so it is possible that the positions of the electrodes and the separators may be displaced while they are being sent between the two positions. As a consequence, there may be a difference between the detected displacement and the displacement when they are stacked and wound, so the displacement of the strip-shaped electrodes and the strip-shaped separators may not be eliminated when the positions of the strip-shaped electrodes and the strip-shaped separators are corrected based on the detected displacement. Moreover, the above-described edge position detecting means cannot detect the displacement that is caused when they are stacked and wound because of the structures of the detecting units 201 to 204.

The electrode winding apparatus provided by the present invention is an electrode winding apparatus for winding a strip-shaped electrode and a strip-shaped separator. Here, the strip-shaped separator is semitransparent, and the electrode winding apparatus has an imaging device for photographing the strip-shaped separator and the strip-shaped electrode through the strip-shaped separator at a location where the strip-shaped electrode and the strip-shaped separator are to be stacked and wound. According to this electrode winding apparatus, the strip-shaped separator is semitransparent, and the imaging device can photograph the strip-shaped separator and the strip-shaped electrode through the strip-shaped separator at a location where the strip-shaped electrode and the strip-shaped separator are stacked and wound.

The strip-shaped electrode may have a coated portion in which an electrode material is coated off-centeredly toward one widthwise side of a strip-shaped sheet, and an uncoated portion in which no electrode material is coated in an edge portion at a widthwise opposite side of the strip-shaped sheet. In this case, the imaging device may be disposed so as to photograph an edge of the strip-shaped separator and an edge of the coated portion of the strip-shaped electrode. By photographing the edge of the strip-shaped separator and the edge of the coated portion in this way, it is possible to confirm whether the coated portion does not stick out from the separator based on a photographed image.

The electrode winding apparatus may have a correction mechanism configured to correct displacement of the strip-shaped electrode and the strip-shaped separator and a control unit configured to control the correction mechanism. The control unit may desirably be configured so as to detect a displacement amount between the strip-shaped electrode and the strip-shaped separator based on an image photographed by the imaging device, and to control the correction mechanism so as to correct the displacement between and the strip-shaped separator and the strip-shaped electrode based on the detected displacement amount. In this case, the electrode winding apparatus can correct displacement between the strip-shaped electrode and the strip-shaped separator, and it can stack and wind the strip-shaped electrode and the strip-shaped separator accurately.

The electrode winding apparatus may comprise an apparatus for stacking in sequence and winding a first strip-shaped electrode, a first strip-shaped separator, a second strip-shaped electrode, and a second strip-shaped separator. In this case, the apparatus may desirably have a first imaging device configured to photograph widthwise displacement of the first strip-shaped electrode and the first strip-shaped separator at a location where the first strip-shaped electrode and the first strip-shaped separator are stacked and wound. The second strip-shaped separator may desirably be semitransparent, and the apparatus may desirably have a second imaging device configured to photograph the second strip-shaped separator and the second strip-shaped electrode through the second strip-shaped separator at a location where the second strip-shaped electrode and the second strip-shaped separator are stacked and wound. In this case, the first strip-shaped electrode and the second strip-shaped electrode can be photographed in an apparatus configuration in which the first strip-shaped electrode, the first strip-shaped separator, the second strip-shaped electrode, and the second strip-shaped separator are stacked in sequence and wound as well.

Each of the first strip-shaped electrode and the second strip-shaped electrode may have a coated portion in which an electrode material is coated off-centeredly toward one widthwise side of a strip-shaped sheet, and an uncoated portion in which no electrode material is coated in an edge portion at a widthwise opposite side of the strip-shaped sheet. In this case, the first imaging device may desirably be disposed so that the edge of the first strip-shaped separator and the edge of the coated portion of the first strip-shaped electrode can be photographed, and the second imaging device may desirably be disposed so that the edge of the second strip-shaped separator and the edge of the coated portion of the second strip-shaped electrode can be photographed. By photographing the edge of the strip-shaped separator and the edge of the coated portion in this way, it is possible to confirm whether the coated portion does not stick out from the separator based on a photographed image.

The electrode winding apparatus may have a first correction mechanism configured to correct displacement of the first strip-shaped electrode and the first strip-shaped separator, a second correction mechanism configured to correct displacement of the second strip-shaped electrode and the second strip-shaped separator, and a control unit configured to control the first correction mechanism and the second correction mechanism. In this case, the control unit may desirably execute a first control process of detecting a displacement amount between the first strip-shaped electrode and the first strip-shaped separator based on an image photographed by the first imaging device, and controlling the first correction mechanism so as to correct the displacement between and the first strip-shaped electrode and the first strip-shaped separator based on the displacement amount. Also, the control unit may desirably execute a second control process of detecting a displacement amount between the second strip-shaped electrode and the second strip-shaped separator based on an image photographed by the second imaging device, and controlling the second correction mechanism so as to correct the displacement between and the second strip-shaped electrode and the second strip-shaped separator based on the displacement amount.

The control unit may execute a third control process of detecting a displacement amount between the first strip-shaped electrode and the second strip-shaped electrode based on images photographed by the first imaging device and the second imaging device, and controlling the first correction mechanism and the second correction mechanism so as to correct displacement between the first strip-shaped electrode and the second strip-shaped electrode based on the detected displacement amount. The third control process makes it possible to correct the relative positions of the first strip-shaped electrode and second strip-shaped electrode that are to be wound, for example.

A method of detecting displacement between a strip-shaped electrode and a strip-shaped separator detects the displacement between the strip-shaped electrode and the strip-shaped separator when stacking and winding the strip-shaped electrode and the strip-shaped separator. In this method, the strip-shaped separator may desirably be semitransparent. The method may desirably comprise a photographing step of photographing the strip-shaped electrode through the strip-shaped separator at a position where the strip-shaped electrode and the strip-shaped separator are stacked, and a displacement detecting step of detecting displacement between the strip-shaped electrode and the strip-shaped separator based on an image photographed in the photographing step.

A method of measuring displacement measures a displacement amount between a strip-shaped electrode and a strip-shaped separator. In this method, the strip-shaped separator may desirably be semitransparent. The method may desirably comprise a photographing step of photographing the strip-shaped electrode through the strip-shaped separator at a position where the strip-shaped electrode and the strip-shaped separator are stacked, and a calculating step of calculating a displacement amount between the strip-shaped electrode and the strip-shaped separator based on an image photographed in the photographing step.

The strip-shaped electrode may have a coated portion in which an electrode material is coated off-centeredly toward one widthwise side of a strip-shaped sheet, and an uncoated portion in which no electrode material is coated in an edge portion at a widthwise opposite side of the strip-shaped sheet. In this case, in the photographing step, an edge of the strip-shaped separator and an edge of the coated portion of the strip-shaped electrode may desirably be photographed at a position where the strip-shaped electrode and the strip-shaped separator are stacked, and in the calculating step, a displacement amount between the edge of the strip-shaped separator and the edge of the coated portion of the strip-shaped electrode may desirably be calculated based on the image photographed in the photographing step.

A displacement amount correcting method may desirably have a correcting step of correcting, when stacking and winding a strip-shaped electrode and a strip-shaped separator, displacement between the strip-shaped electrode and the strip-shaped separator, based on a displacement amount calculated by the above-described displacement amount measuring method.

In an electrode winding method, the strip-shaped electrode and the strip-shaped separator may be stacked and wound while correcting displacement of the strip-shaped electrode and the strip-shaped separator by the displacement amount correcting method.

DETAILED DESCRIPTION OF THE INVENTION

Figure 1:
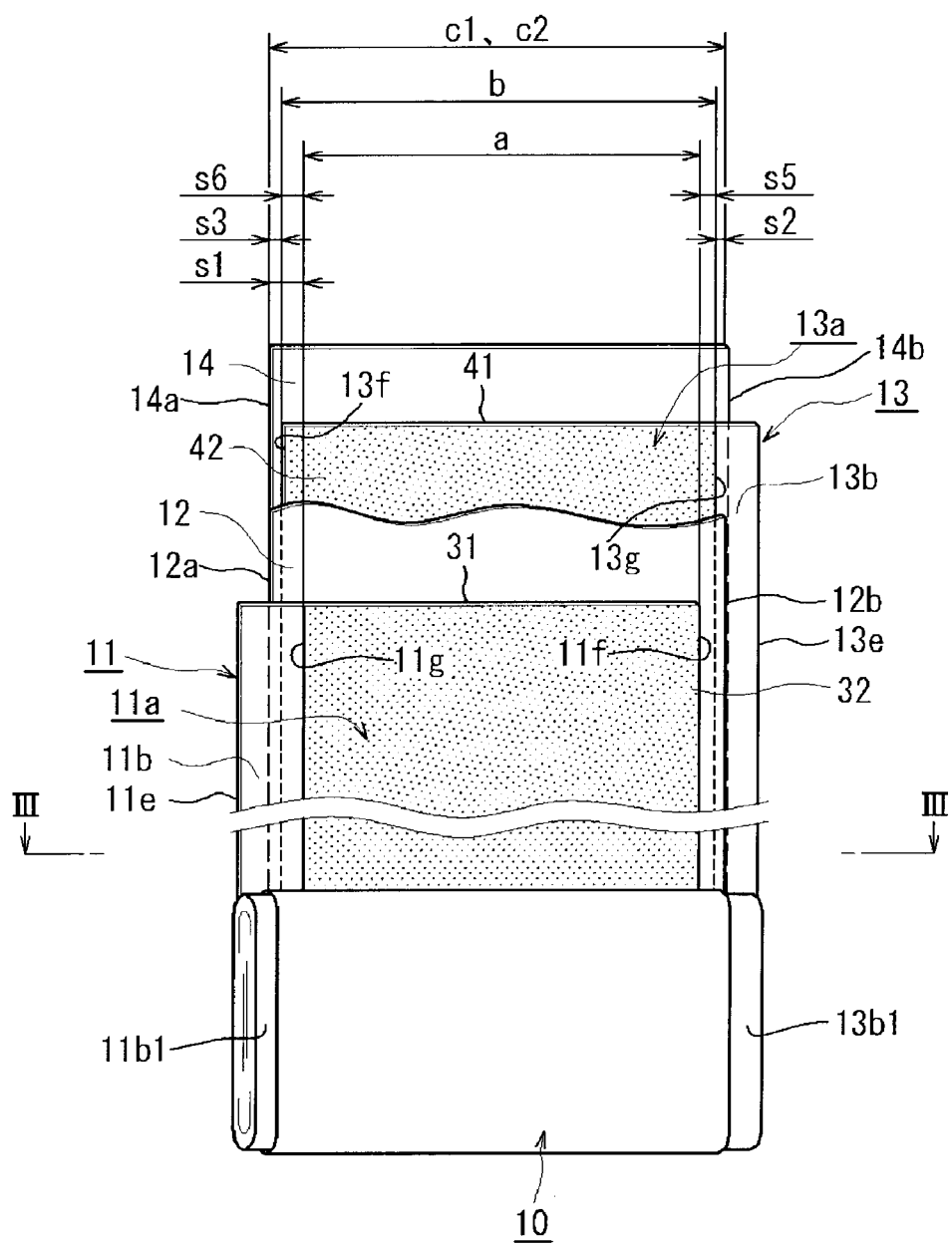
FIG. 1 is a view illustrating a wound electrode body according to one embodiment of the present invention.

The following describes, with reference to the drawings, a method of detecting displacement between a strip-shaped electrode and a strip-shaped separator, a method of measuring the displacement amount, a method of correcting the displacement amount, an electrode winding method, and an electrode winding apparatus according to one embodiment of the present invention. The members and components that exhibit the same functions are denoted by the same reference symbols. It should be noted that the dimensional relationship (length, width, thickness, and the like) in the drawings does not reflect actual dimensional relationship.

Figure 2:
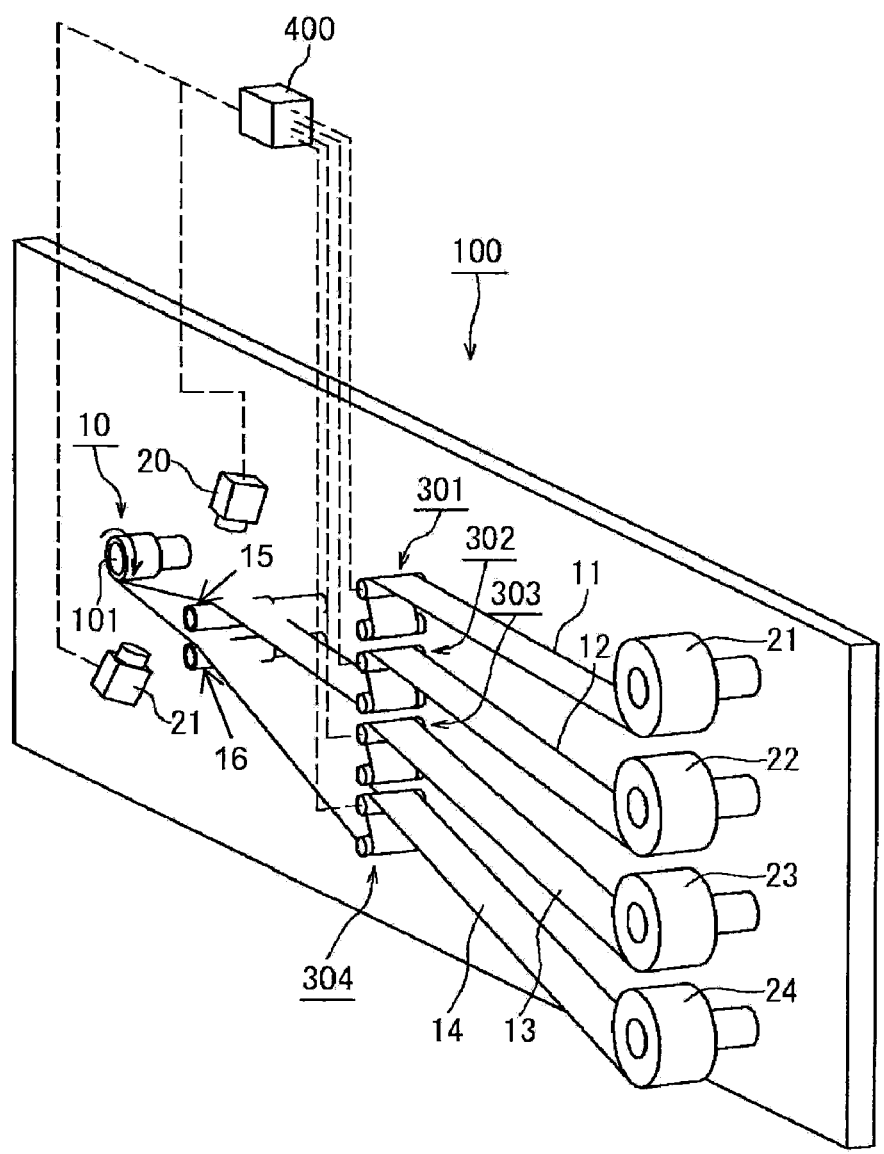
FIG. 2 is a perspective view illustrating an electrode winding apparatus according to one embodiment of the present invention.

These methods and an electrode winding apparatus 100 according to the present invention may, for example, be used for an apparatus for manufacturing wound electrode bodies of lithium-ion secondary batteries. As illustrated in FIG. 1, a wound electrode body 10 has a strip-shaped positive electrode 11, a first strip-shaped separator 12, a strip-shaped negative electrode 13, and a second strip-shaped separator 14 that are stacked in that order and wound together. As illustrated in FIG. 2, the electrode winding apparatus 100 for winding a pair of the positive and negative strip-shaped electrodes 11, 13 and a pair of the strip-shaped separators 12, 14 winds the strip-shaped electrodes 11, 13 and the strip-shaped separators 12, 14, which are stacked in sequence, around a winding shaft 101. The strip-shaped electrodes 11, 13 and the strip-shaped separators 12, 14 are supplied from rolls 21 to 24, around which the respective electrodes and separators are wound.

Figure 3:
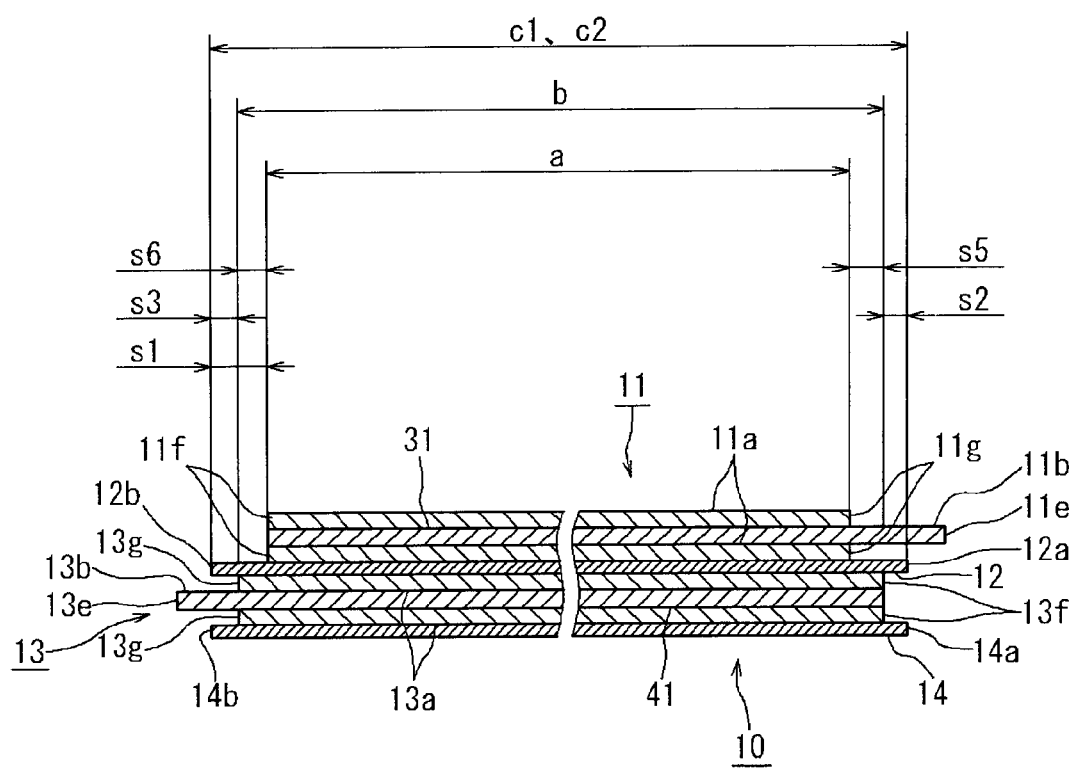
FIG. 3 is a cross-sectional view taken along line of FIG. 1, which illustrates the electrode structure of the wound electrode body according to one embodiment of the present invention.

As illustrated in FIG. 1, the positive and negative strip-shaped electrodes 11 and 13 have respective coated portions 11a and 13a, in which electrode materials 32 and 42 are coated off-centeredly toward one widthwise sides of strip-shaped sheets 31 and 41. In this embodiment, the coated portions 11a and 13a are formed on both faces of the respective strip-shaped sheets 31 and 41. At the edge portions that are on widthwise opposite sides of the strip-shaped sheets 31, 41, the positive and negative strip-shaped electrodes 11, 13 have uncoated portions 11b, 13b, in which the electrode materials 32, 42 are not coated. At both ends perpendicular to the winding direction of the wound electrode body 10, the uncoated portions 11b, 13b of the strip-shaped positive electrode 11 and the strip-shaped negative electrode 13 stick out from the strip-shaped separators 12, 14. The uncoated portions 11b, 13b of the strip-shaped positive electrode 11 and the strip-shaped negative electrode 13 form positive and negative electrode current collectors 11b1, 13b1 of the wound electrode body 10, respectively. FIG. 3 is a widthwise cross-sectional view showing the strip-shaped positive electrode 11, the first strip-shaped separator 12, the strip-shaped negative electrode 13, and the second strip-shaped separator 14 stacked in sequence.

In this wound electrode body 10, as illustrated in FIGS. 1 and 3, the coated portion 11a of the strip-shaped positive electrode 11 and the coated portion 13a of the strip-shaped negative electrode 13 oppose each other across the strip-shaped separators 12, 14. It is desired that, in such a wound electrode body 10, the coated portion 11a of the strip-shaped positive electrode 11 should not stick out from the coated portion 13a of the strip-shaped negative electrode 13 in order to prevent internal short circuits. Likewise, in order to prevent internal short circuits, it is desired that the coated portion 11a of the strip-shaped positive electrode 11 and the coated portion 13a of the strip-shaped negative electrode 13 should not stick out from the strip-shaped separators 12, 14. However, it is possible that manufacturing errors may occur in the widths of the coated portion 11a of the strip-shaped positive electrode 11 and the coated portion 13a of the strip-shaped negative electrode 13. In addition, widthwise displacement may occur when stacking the strip-shaped positive electrode 11 and the strip-shaped negative electrode 13, and the strip-shaped separators 12, 14. For this reason, a difference (b−a) between a width b of the coated portion 13a of the strip-shaped negative electrode 13 and a width a of the coated portion 11a of the strip-shaped positive electrode 11 and a difference ((c1, c2)−b) between a width c1 or c2 of the first strip-shaped separator 12 or the second strip-shaped separator 14 and the width b of the coated portion 13a of the strip-shaped negative electrode 13 are made large so that such errors and displacement can be permitted.

Figure 4:
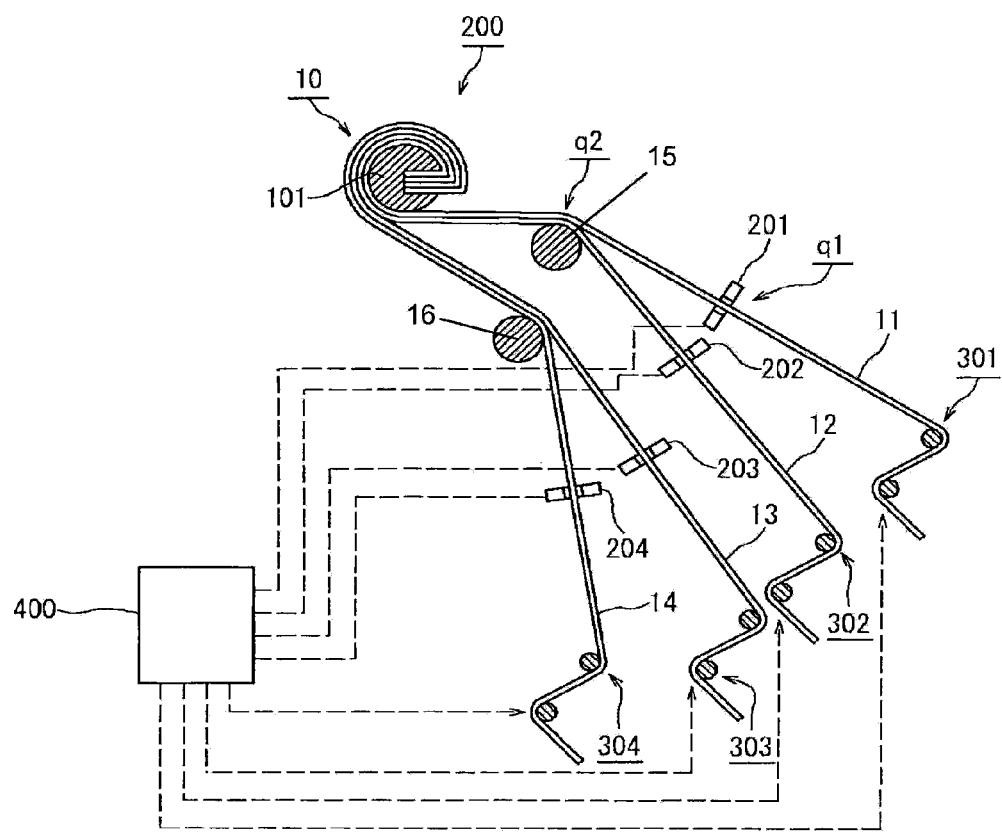
FIG. 4 is a side view illustrating an electrode winding apparatus having an edge detecting means.

An electrode winding apparatus 200 provided with the edge detecting means as described in Patent References 1 and 2 has the detecting units 201 to 204 extending so as to enclose the widthwise edge portions of the strip-shaped electrodes 11, 13 and the strip-shaped separators 12, 14 vertically from the outer periphery, as illustrated in FIG. 4. The detecting units 201 to 204 need to be placed at positions where the strip-shaped electrodes 11, 13 and strip-shaped separators 12, 14 are detached, because the detecting units extend so as to enclose the widthwise edge portions of the strip-shaped electrodes 11, 13 and the strip-shaped separators 12, 14 vertically from the outer periphery. The positions q1 at which the positions of the strip-shaped electrodes 11, 13 and the strip-shaped separators 12, 14 are detected are distant from the positions q2 at which the strip-shaped electrodes 11, 13 and the strip-shaped separators 12, 14 are actually stacked via guide members 15, 16. There is quite a distance from each of the positions q1 at which the positions of the strip-shaped electrodes 11, 13 and the strip-shaped separators 12, 14 are detected to each of the positions q2 at which they are stacked, so it is possible that the positions of the electrodes and the separators may be displaced while they are being sent between the two positions. Accordingly, if the positions of the strip-shaped electrodes 11, 13 and the strip-shaped separators 12, 14 are corrected based on the displacement of both the electrodes and separators that has been detected at the positions q1, the displacement of the strip-shaped electrodes 11, 13 and the strip-shaped separators 12, 14 may not be eliminated.

Such an edge detecting means can detect both widthwise edges of the strip-shaped electrodes 11, 13 and both widthwise edges 12a, 12b, 14a, 14b of the strip-shaped separators 12, 14, as illustrated in FIG. 1. However, as for the positions of the strip-shaped electrodes 11, 13, it is difficult to directly detect the edges 11g, 13g of the coated portions 11a, 13a from the side where the uncoated portions 11b, 13b exist. Specifically, by such an edge detecting means, the positions of the edges 11e, 13e of the strip-shaped electrodes 11, 13 that are in the sides where the uncoated portions 11b, 13b exist are detected on the side where the uncoated portions 11b, 13b exist. For this reason, the edges 11g, 13g of the coated portions 11a, 13a of the strip-shaped electrodes 11, 13 are detected taking into account the widths of the uncoated portions 11b, 13b. However, errors are produced in the detected edges 11g, 13g of the coated portions 11a, 13a because there are variations in the widths of the uncoated portions 11b, 13b.

The above-mentioned difference (b−a) is set wide taking into consideration such errors and displacement, and thereby, the coated portion 11a of the strip-shaped positive electrode 11 is prevented from sticking out from the coated portion 13a of the strip-shaped negative electrode 13. Likewise, the above-mentioned difference ((c1, c2)−b) is set wide so that the coated portion 11a of the strip-shaped positive electrode 11 and the coated portion 13a of the strip-shaped negative electrode 13 do not stick out from the strip-shaped separators 12, 14, respectively.

The present inventors considered if there is a method by which the both widthwise edges 11f, 11g, 13f, 13g of the coated portions 11a, 13a of the strip-shaped electrodes 11, 13 to be stacked and the both widthwise edges 12a, 12b, 14a, 14b of the strip-shaped separators 12, 14 to be stacked can be detected directly and accurately. If these can be detected directly and accurately, displacement in winding the strip-shaped electrodes 11, 13 and the strip-shaped separators 12, 14 can be prevented more reliably. As a result, the difference (b−a) and the difference ((c1, c2)−b) can be made small. If the difference (b−a) and the difference ((c1, c2)−b) can be made small, manufacturing costs (especially the material costs of the strip-shaped electrodes and the strip-shaped separators) can be reduced correspondingly and the battery performance can be improved correspondingly. Bearing this in mind, the present inventors have investigated various methods and apparatuses for directly and accurately detecting the both widthwise edges 11f, 11g, 13f, 13g of the coated portions 11a, 13a of the strip-shaped electrodes 11, 13 and the both widthwise edges 12a, 12b, 14a, 14b of the strip-shaped separators 12, 14.

Figure 5:
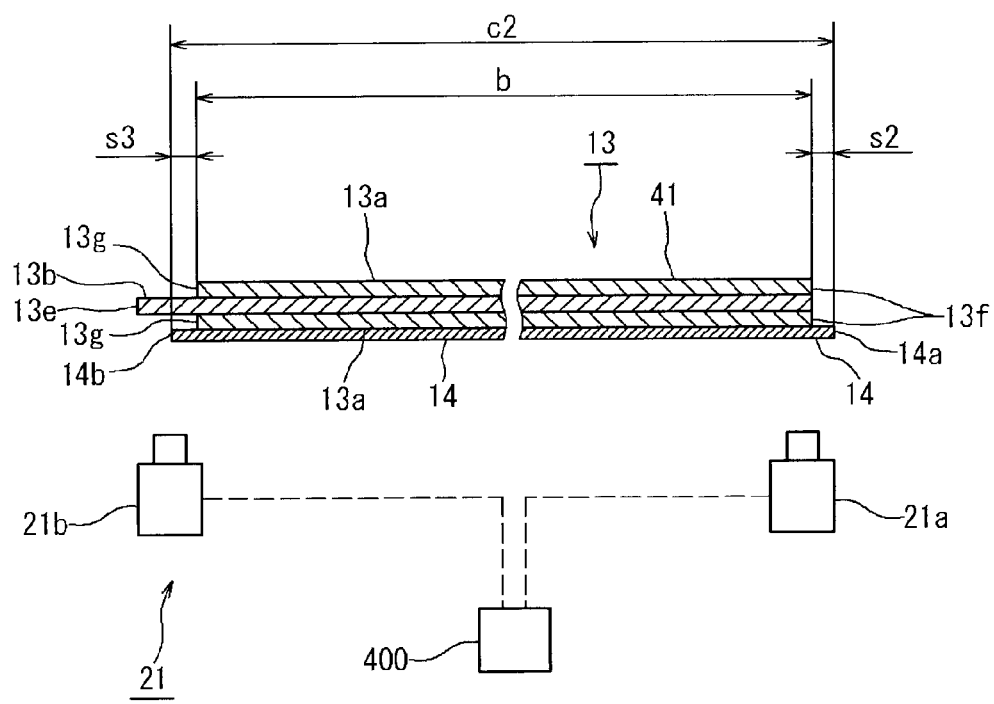
FIG. 5 is a cross-sectional view showing a state in which a sheet-shaped positive electrode and a strip-shaped separator are stacked in an electrode winding apparatus according to one embodiment of the present invention.
Figure 6:
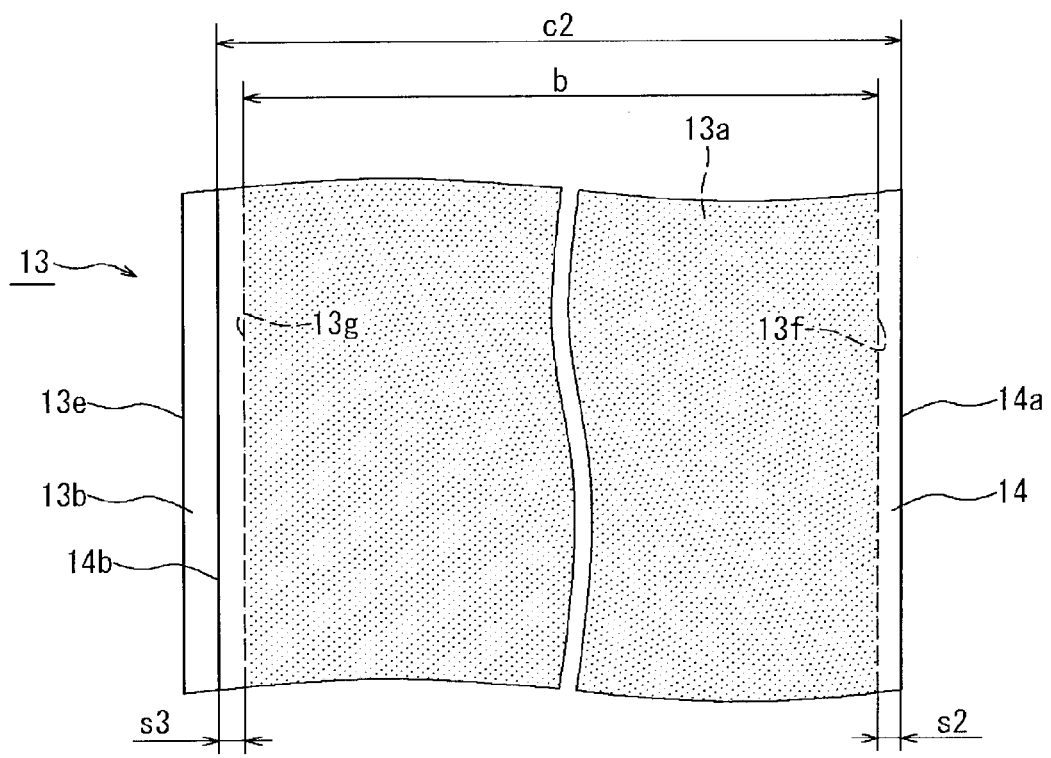
FIG. 6 is a plan view showing a state in which a strip-shaped positive electrode and a strip-shaped separator are stacked in an electrode winding apparatus according to one embodiment of the present invention.

During the investigation, the present inventors discovered that when the strip-shaped separator 14 is semitransparent, the coated portion 13a of the strip-shaped electrode 13 is visible through the strip-shaped separator 14 in the state in which the strip-shaped electrode 13 and the strip-shaped separator 14 are stacked together, as illustrated in FIGS. 5 and 6. The present inventors focused attention on this phenomenon, and conceived of a method and an apparatus for detecting the both widthwise edges 13f, 13g of the coated portion 13a and the both widthwise edges 14a, 14b of the strip-shaped separator 14 directly and accurately. Although FIG. 5 shows the state in which the strip-shaped negative electrode 13 and the second the strip-shaped separator 14 as the strip-shaped electrodes are stacked, the coated portion 11a of the strip-shaped positive electrode 11 is likewise visible through the first strip-shaped separator 12 in a state in which the strip-shaped positive electrode 11 and the first strip-shaped separator 12 are stacked together, when the first strip-shaped separator 12 is semitransparent.

First, as illustrated in FIG. 5, in a displacement detecting method of detecting displacement of the strip-shaped electrode 13 and the strip-shaped separator 14, the strip-shaped separator 14 is semitransparent, and the strip-shaped electrode 13 is photographed through the strip-shaped separator 14 in a position at which the strip-shaped electrode 13 and the strip-shaped separator 14 are stacked (photographing step). Then, based on an image photographed in the photographing step, displacement between the strip-shaped electrode 13 and the strip-shaped separator 14 is detected (displacement detecting step). In a displacement amount measuring method of measuring the displacement amount, the displacement amount between the strip-shaped electrode 13 and the strip-shaped separator 14 is calculated based on the image photographed in the photographing step (calculating step).

In the photographing step, when the strip-shaped electrode 13 has, as illustrated in FIG. 5, the coated portion 13a, in which an electrode material is coated off-centeredly toward one widthwise side of the strip-shaped sheet 41, and the uncoated portion 13b, in which the electrode material is not coated in the edge portion of the widthwise opposite side of the strip-shaped sheet 41, the edges 14a, 14b of the strip-shaped separator 14 and the edges 13f, 13g of the coated portion 13a of the strip-shaped electrode 13 may desirably be photographed at a position where the strip-shaped electrode 13 and the strip-shaped separator 14 are stacked. In this case, in the calculating step of calculating a displacement amount, the displacement amount of the edges 14a, 14b of the strip-shaped separator 14 and the edges 13f, 13g of the coated portion 13a of the strip-shaped electrode 13 may desirably be calculated based on the image photographed in the photographing step. In a displacement amount correcting method of the strip-shaped electrode 13 and the strip-shaped separator 14, the displacement amount between the strip-shaped electrode 13 and the strip-shaped separator 14 may desirably be correct when stacking and winding the strip-shaped electrode 13 and the strip-shaped separator 14, based on the displacement amount calculated in the above-described displacement amount measuring method. In an electrode winding method of stacking and winding the strip-shaped electrode 13 and the strip-shaped separator 14, the strip-shaped electrode 13 and the strip-shaped separator 14 may desirably be stacked and wound while correcting the displacement between the strip-shaped electrode 13 and the strip-shaped separator 14 by the above-described displacement amount correcting method.

The following describes the electrode winding apparatus 100, by which the foregoing various s methods are embodied.

Figure 7:
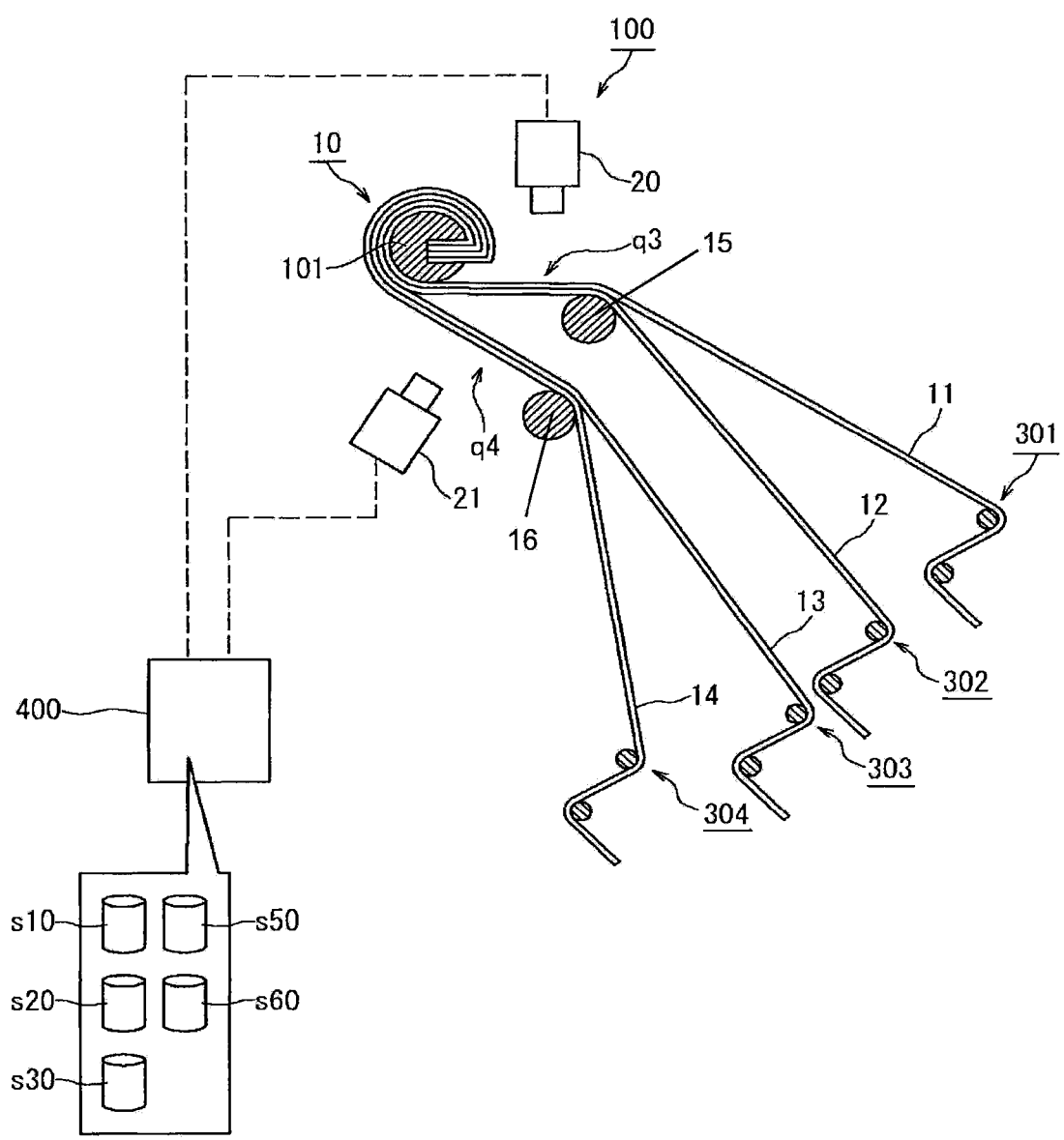
FIG. 7 is a side view illustrating an electrode winding apparatus according to one embodiment of the present invention.

This electrode winding apparatus 100 is, as illustrated in FIGS. 2 and 7, an apparatus for stacking in sequence and winding the strip-shaped positive electrode 11 (first strip-shaped electrode), the first strip-shaped separator 12, the strip-shaped negative electrode 13 (second strip-shaped electrode), and the second strip-shaped separator 14. This electrode winding apparatus 100 is furnished with a first imaging device unit 20 that photographs widthwise displacement of the strip-shaped positive electrode 11 and the first strip-shaped separator 12 that are stacked and wound, and a second imaging device unit 21 that photographs widthwise displacement of the strip-shaped negative electrode 13 and the second strip-shaped separator 14.

Here, the term "imaging device" refers to a device that photographs an image of a subject. For the first imaging device unit 20 and the second imaging device unit 21, it is desirable to employ an imaging device that is suitable for photographing the strip-shaped electrodes 11, 13 and the strip-shaped separators 12, 14 and has a required photographing function, as required by the use environment in the electrode winding apparatus 100. In this embodiment, a camera provided with a required photographing function, more specifically, a digital camera or a digital video camera, is adopted for the first imaging device unit 20 and the second imaging device unit 21. The term "imaging device" is meant to include not only a digital camera and a digital video camera but also an image recognition device (for example, a device having an image sensor) that recognizes an image of a subject.

The first imaging device unit 20 and the second imaging device unit 21 are connected to a control unit 400. The information photographed by the first imaging device unit 20 and the second imaging device unit 21 is sent to the control unit 400. The control unit 400 has an arithmetic unit comprising, for example, a CPU, and a storing unit comprising, for example, a non-volatile memory, and it executes various electronic arithmetic processes for the electrode winding apparatus 100 and control processes for various components according to predetermined programs.

The first imaging device unit 20 photographs, from above, a portion in which the strip-shaped positive electrode 11 is stacked on top of the first strip-shaped separator 12, as illustrated in FIGS. 2 and 7. The first imaging device unit 20 photographs, from above, a portion in which the strip-shaped positive electrode 11 is stacked on top of the first strip-shaped separator 12 so that it can photograph widthwise displacement of the strip-shaped positive electrode 11 and the first strip-shaped separator 12, as illustrated in FIG. 8.

Figure 8:
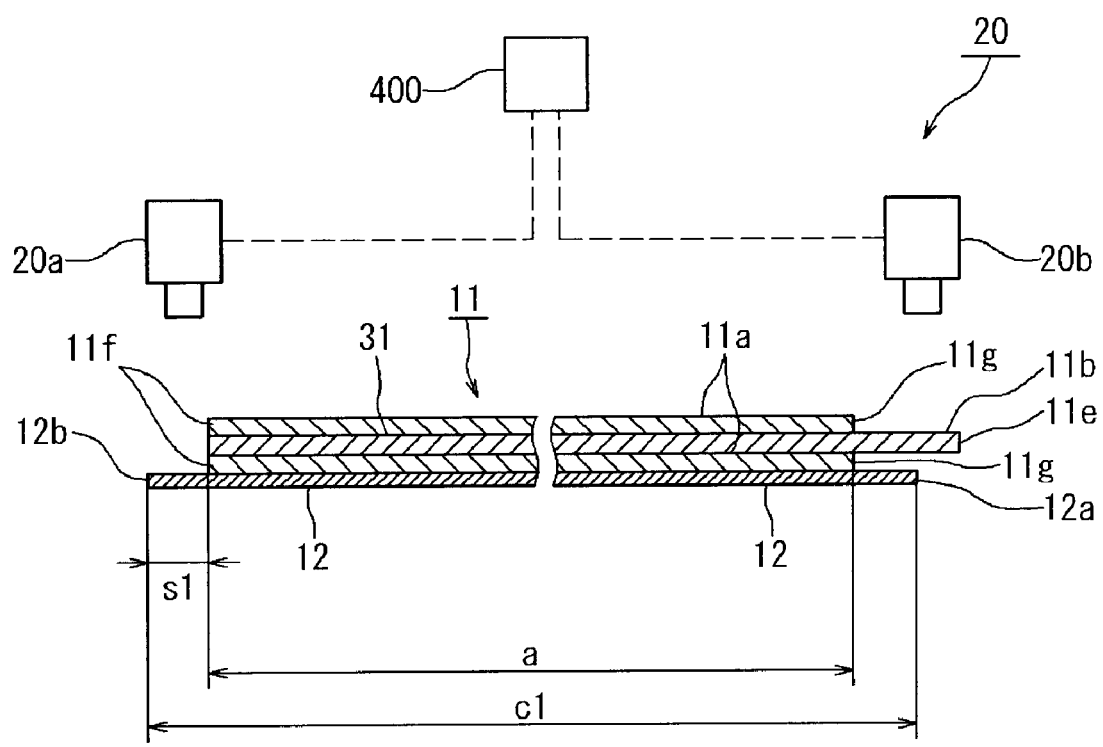
FIG. 8 is a cross-sectional view showing a state in which a strip-shaped negative electrode and a strip-shaped separator are stacked in an electrode winding apparatus according to one embodiment of the present invention.
Figure 9:
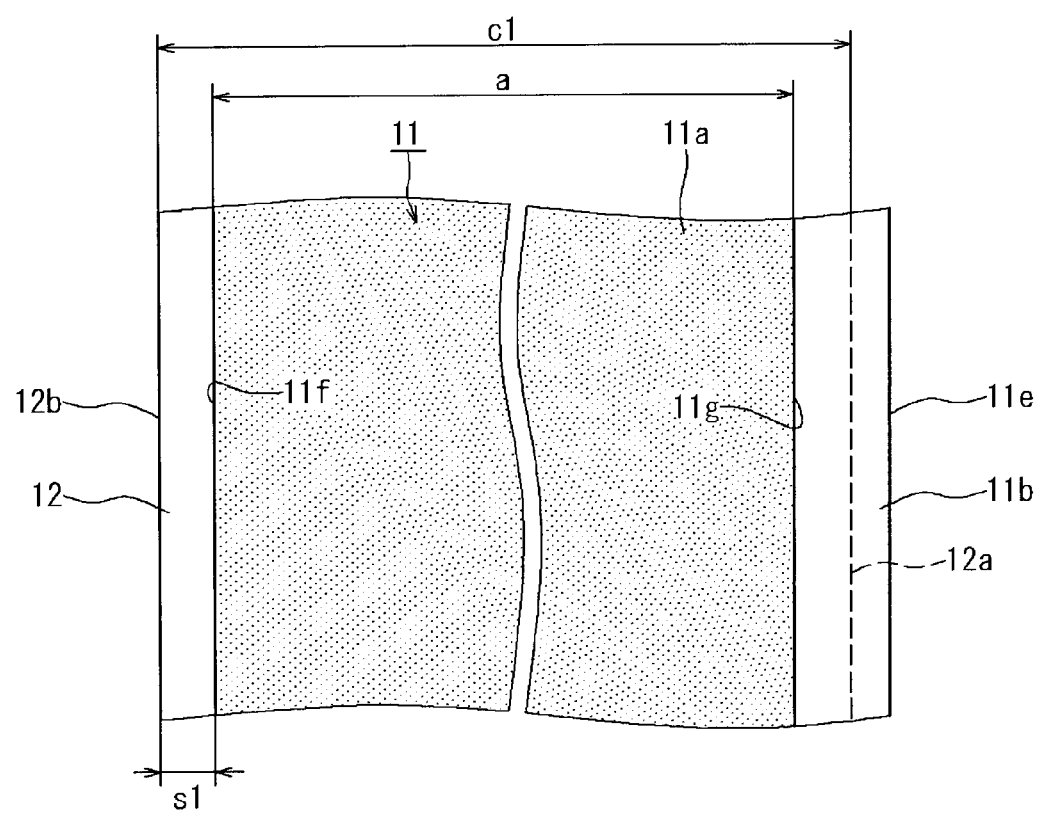
FIG. 9 is a plan view showing a state in which a strip-shaped negative electrode and a strip-shaped separator are stacked in an electrode winding apparatus according to one embodiment of the present invention.

In this embodiment, the first imaging device unit 20 has two imaging devices 20a and 20b for photographing both widthwise side edge portions, as illustrated in FIG. 8. The imaging device 20a that is at one widthwise side can photograph a state in which the first strip-shaped separator 12 sticks out from the edge 11f of the strip-shaped positive electrode 11, as illustrated in FIG. 9. The photographed information is sent to the control unit 400. Based on the photographed information (image), the control unit 400 can detect the position of the edge 11f of the strip-shaped positive electrode 11 and the position of the edge 12b of the first strip-shaped separator 12 from the difference between the color of the coated portion 11a of the strip-shaped positive electrode 11, the color of the first strip-shaped separator 12, and the color of the background, utilizing an existing image processing technique. Then, based on the position of the edge 11f of the strip-shaped positive electrode 11 and the position of the edge 12b of the first strip-shaped separator 12 that have been detected, the amount s1 of the first strip-shaped separator 12 that sticks out from the edge 11f of the coated portion 11a of the strip-shaped positive electrode 11 can be detected.

The imaging device 20b at the widthwise opposite side can photograph the edge 11e of the strip-shaped positive electrode 11 and the edge 11g of the coated portion 11a of the strip-shaped positive electrode 11. The control unit 400 can detect the positions of the edges 11e and 11g based on an image photographed by the imaging device 20b. It should be noted that the edge 12a of the first strip-shaped separator 12 cannot be photographed by the imaging device 20b because it is at the back of the strip-shaped positive electrode 11, so the control unit 400 cannot detect the edge 12a.

Next, the second imaging device unit 21 photographs, from below, a portion in which the second strip-shaped separator 14 is attached below the strip-shaped negative electrode 13, as illustrated in FIGS. 2 and 7. In this embodiment, the second strip-shaped separator 14 is semitransparent. In this embodiment, the second imaging device unit 21 has two imaging devices 21a and 21b for respectively photographing both widthwise side edge portions, as illustrated in FIG. 5. The two imaging devices 21a, 21b photograph the strip-shaped negative electrode 13 and the second strip-shaped separator 14 that are stacked and wound. In this case, since the strip-shaped negative electrode 13 and the second strip-shaped separator 14 are overlapped, the two imaging devices 21a, 21b can photograph the strip-shaped electrode 13 through the second strip-shaped separator 14.

The imaging device 21a at one widthwise side can photograph the edge 14a of the second strip-shaped separator 14, as illustrated in FIG. 6. Moreover, it can photograph the coated portion 13a of the strip-shaped negative electrode 13 through the second strip-shaped separator 14. The photographed information is sent to the control unit 400. Based on the photographed information (image), the control unit 400 can detect the position of the edge 14a of the second strip-shaped separator 14 from the difference between the colors of the second strip-shaped separator 14 and the background, utilizing an existing image processing technique. Moreover, the control unit 400 can detect the position of the edge 13f of the coated portion 13a from the difference between the colors of the second strip-shaped separator 14 and the coated portion 13a of the strip-shaped negative electrode 13, which has been photographed through the second strip-shaped separator 14. Based on the detected position of the edge 14a of the second strip-shaped separator 14 and the detected position of the edge 13f of the coated portion 13a of the strip-shaped negative electrode 13, the amount s2 of the second strip-shaped separator 14 that sticks out from the coated portion 13a of the strip-shaped negative electrode 13 can be detected.

The imaging device 21b at the widthwise opposite side can photograph the edge 13e at the opposite side of the strip-shaped negative electrode 13 and the edge 14b at the opposite side of the second strip-shaped separator 14. Moreover, in this embodiment, since the second strip-shaped separator 14 is semitransparent, the edge 13g at the opposite side of the coated portion 13a of the strip-shaped negative electrode 13 stacked on the second strip-shaped separator 14 is photographed. The control unit 400 can detect the position of the edge 13e at the opposite side of the strip-shaped negative electrode 13 from the difference between the colors of the strip-shaped negative electrode 13 and the background. It can also detect the position of the edge 14b of the second strip-shaped separator 14 from the difference between the colors of the strip-shaped negative electrode 13 and the second strip-shaped separator 14. Furthermore, the control unit 400 can detect the position of the edge 13g of the coated portion 13a of the strip-shaped negative electrode 13 from the difference between the colors of the second strip-shaped separator 14 and the coated portion 13a of the strip-shaped negative electrode 13, which has been photographed through the second strip-shaped separator 14. The amount s3 of the second strip-shaped separator 14 that sticks out from the coated portion 13a of the strip-shaped negative electrode 13 can be detected from the position of the edge 14b of the second strip-shaped separator 14 and the position of the edge 13g of the coated portion 13a of the strip-shaped negative electrode 13.

In this embodiment, by the first imaging device unit 20 (the imaging device 20a in this embodiment) shown in FIG. 8, the amount s1 of the first strip-shaped separator 12 that sticks out from the edge 11f of the coated portion 11a of the strip-shaped positive electrode 11 can be detected at one widthwise side. Based on the detected s1, and additionally considering the permissible dimensional tolerance limit of the width c1 of the first strip-shaped separator 12 and the width a of the coated portion 11a of the strip-shaped positive electrode 11, it is possible to detect whether the coated portion 11a sticks out from the first strip-shaped separator 12. In addition, in this embodiment, based on an image photographed by the second imaging device unit 21 (the two imaging devices 21a, 21b in this embodiment), the control unit 400 can detect the amounts s2 and s3 of the second strip-shaped separator 14 that sticks out from the coated portion 13*a* of the strip-shaped negative electrode 13 at both widthwise sides, as illustrated in FIG. 5. Based on either the detected s2 or s3, and additionally considering the permissible dimensional tolerance limit of the width of the second strip-shaped separator 14 and the width of the coated portion 13*a* of the strip-shaped negative electrode 13, it is possible to detect whether the coated portion 13*a* sticks out from the second strip-shaped separator 14.

In this embodiment, as illustrated in FIG. 7, the first imaging device unit 20 is disposed so as to photograph a portion q3, at which the strip-shaped positive electrode 11 and the first strip-shaped separator 12 are stacked and wound. The second imaging device unit 21 is disposed so as to photograph a portion q4, at which the strip-shaped negative electrode 13 and the second strip-shaped separator 14 are stacked and wound. The strip-shaped positive electrode 11 and the first strip-shaped separator 12 as well as the strip-shaped negative electrode 13 and the second strip-shaped separator 14 are wound up almost without being displaced from the positions q3 and q4, respectively. This electrode winding apparatus 100 detects the widthwise positions of the strip-shaped positive electrode 11 and the first strip-shaped separator 12, as well as those of the strip-shaped negative electrode 13 and the second strip-shaped separator 14, at the positions q3 and q4. Accordingly, this electrode winding apparatus 100 can detect the widthwise positions of the strip-shaped positive electrode 11 and the first strip-shaped separator 12, and the strip-shaped negative electrode 13 and the second strip-shaped separator 14, which constitute the wound electrode body 10, substantially directly and accurately. Based on the foregoing images, this electrode winding apparatus 100 detects the widthwise displacement amounts of the strip-shaped positive electrode 11 and the first strip-shaped separator 12, as well as those of the strip-shaped negative electrode 13 and the second strip-shaped separator 14. Based on the detected displace amounts, this electrode winding apparatus 100 corrects the widthwise displacement of the strip-shaped positive electrode 11 and the first strip-shaped separator 12, as well as that of the strip-shaped negative electrode 13 and the second strip-shaped separator 14. Thus, this electrode winding apparatus 100 can accurately correct the displacement of the strip-shaped positive electrode 11 and the first strip-shaped separator 12, as well as that of the strip-shaped negative electrode 13 and the second strip-shaped separator 14.

Specifically, in this embodiment, the first imaging device 301 has the electrode winding apparatus 100 has first correction mechanisms 301, 302, second correction mechanisms 303, 304, and the control unit 400, as illustrated in FIG. 7.

The first correction mechanisms 301, 302 correct displacement of the strip-shaped positive electrode 11 (the first strip-shaped electrode) and the first strip-shaped separator 12. The second correction mechanisms 303, 304 correct displacement of the strip-shaped negative electrode 13 (the second strip-shaped electrode) and the second strip-shaped separator 14.

The control unit 400 controls the first correction mechanisms 301, 302 and the second correction mechanisms 303, 304. In this embodiment, the control unit 400 detects a displacement amount of the strip-shaped positive electrode 11 and the first strip-shaped separator 12 based on an image photographed by the first imaging device unit 20. In this embodiment, the amount s1 of the first strip-shaped separator 12 that sticks out from the edge 11*f* of the coated portion 11*a* of the strip-shaped positive electrode 11 can be detected, as described above. The control unit 400 stores a predetermined value corresponding to s1 as a reference value s10, and determines a difference (s1−s10) as the displacement amount of the strip-shaped positive electrode 11 and the first strip-shaped separator 12. Based on the just-mentioned displace amount, it controls the first correction mechanisms 301, 302 so as to correct the displacement of the strip-shaped positive electrode 11 and the first strip-shaped separator 12 (a first control process).

Likewise, the control unit 400 detects a displacement amount of the strip-shaped negative electrode 13 and the second strip-shaped separator 14 based on an image photographed by the second imaging device unit 21. In this embodiment, based on the image photographed by the second imaging device unit 21 (the two imaging devices 21*a*, 21*b* in this embodiment), the control unit 400 can detect the amounts s2 and s3 of the second strip-shaped separator 14 that sticks out from the coated portion 13*a* of the strip-shaped negative electrode 13 at both widthwise sides, as described above. The control unit 400 stores predetermined values corresponding to s2 and s3 as a reference values s20 and s30, and determines a difference (s2−s20) or a difference (s3−s30) as the displacement amount of the strip-shaped negative electrode 13 and the second strip-shaped separator 14. Based on the just-mentioned displace amount, it controls the second correction mechanisms 303, 304 so as to correct the displacement of the strip-shaped negative electrode 13 and the second strip-shaped separator 14 (a second control process).

The displacement of the strip-shaped positive electrode 11 and the first strip-shaped separator 12 and the displacement of the strip-shaped negative electrode 13 and the second strip-shaped separator 14 can be corrected by executing the first control process and the second control process. Thereby, the displacement of the strip-shaped positive electrode 11 and the first strip-shaped separator 12 and the displacement of the strip-shaped negative electrode 13 and the second strip-shaped separator 14 can be corrected so that the coated portion 11*a* of the strip-shaped positive electrode 11 and the coated portion 13*a* of the strip-shaped negative electrode 13 do not stick out from the strip-shaped separators 12 and 14, respectively. This prevents the internal short circuits resulting from the coated portion 11*a* of the strip-shaped positive electrode 11 and the coated portion 13*a* of the strip-shaped negative electrode 13 sticking out from the strip-shaped separators 12 and 14, respectively.

In this embodiment, the first imaging device unit 20 and the second imaging device unit 21 are fixed at predetermined positions of the electrode winding apparatus 100. As illustrated in FIGS. 6 and 9, the control unit 400 can detect a relative displacement amount of the strip-shaped positive electrode 11 and the strip-shaped negative electrode 13, based on the images photographed by the first imaging device unit 20 and the second imaging device unit 21. As described above, the relative positions of the edges 11*f*, 11*g* the coated portion 11*a* of the strip-shaped positive electrode 11 with respect to the first imaging device unit 20 can be detected based on an image photographed by the first imaging device unit 20 (the imaging devices 20*a*, 20*b*). In addition, the relative positions of the edges 13*f*, 13*g* the coated portion 13*a* of the strip-shaped negative electrode 13 with respect to the second imaging device unit 21 can be detected based on an image photographed by the second imaging device unit 21 (the imaging devices 21*a*, 21*b*). Since the first imaging device unit 20 and the second imaging device unit 21 are fixed at predetermined positions of the electrode winding apparatus 100, the amounts s5, s6 of the coated portion 13*a* of the strip-shaped negative electrode 13 that sticks out from the coated portion 11*a* of the strip-shaped positive electrode 11 can be detected at both widthwise sides, based on the relative positional relationship between the edges 11*f*, 11*g* and the edges 13*f*, 13*g*.

In this embodiment, the control unit 400 stores predetermined values corresponding to s5 and s6 as a reference values s50 and s60, and determines a difference (s5–s50) or a difference (s6–s60) as the displacement amount of the strip-shaped positive electrode 11 and the strip-shaped negative electrode 13. Based on the just-mentioned displace amount, it controls the first correction mechanisms 302, 302 and the second correction mechanisms 303, 304 so as to correct the displacement of the strip-shaped positive electrode 11 and the strip-shaped negative electrode 13 (a third control process). The displacement of the strip-shaped positive electrode 11 and the strip-shaped negative electrode 13 can be corrected by executing the third control process. Thus, the displacement of the strip-shaped positive electrode 11 and the strip-shaped negative electrode 13 can be corrected so that the coated portion 11a of the strip-shaped positive electrode 11 does not stick out from the coated portion 13a of the strip-shaped negative electrode 13. This prevents the internal short circuits resulting from the coated portion 11a of the strip-shaped positive electrode 11 and the coated portion 13a of the strip-shaped negative electrode 13 sticking out from the strip-shaped separators 12 and 14, respectively.

In the electrode winding apparatus 100, as illustrated in FIG. 5, the strip-shaped separator 14 is semitransparent. The electrode winding apparatus 100 has the imaging device unit 21 for photographing the strip-shaped separator 14 and the strip-shaped electrode 13 through the strip-shaped separator 14 at a location where the strip-shaped electrode 13 and the strip-shaped separator 14 are stacked and wound. With the imaging device unit 21, the strip-shaped electrode 13 can be photographed through the strip-shaped separator 14 at a location where the strip-shaped electrode 13 and the strip-shaped separator 14 are stacked, because the strip-shaped separator 14 is semitransparent. For example, in the just-mentioned image, the coated portion 13a of the strip-shaped electrode 13 is photographed through the strip-shaped separator 14. Based on the just-mentioned image, the positions of the edges 13f, 13g of the coated portion 13a can be detected directly.

In this electrode winding apparatus 100, as illustrated in FIG. 7, the strip-shaped positive electrode 11, the first strip-shaped separator 12, the strip-shaped negative electrode 13, and the second strip-shaped separator 14 are stacked in sequence and wound together. In this case, the first imaging device unit 20 may desirably be disposed above the first strip-shaped electrode 11 at a location where the first strip-shaped electrode 11 and the first strip-shaped separator 12 are stacked and wound. In this case, the second imaging device unit 21 may desirably be disposed below the second strip-shaped separator 14 at a location where the second strip-shaped electrode 13 and the second strip-shaped separator 14 are stacked and wound. That is, in the configuration in which the first strip-shaped electrode 11, the first strip-shaped separator 12, the second strip-shaped electrode 13, and the second strip-shaped separator 14 are stacked in sequence and wound as well, the first imaging device unit 20 may desirably be provided so as to be directed toward the portion q3, in which the first strip-shaped electrode 11 and the first strip-shaped separator 12 are stacked and wound. The second imaging device unit 21 may desirably be provided so as to be directed toward the portion q4, in which the second strip-shaped electrode 13 and the second strip-shaped separator 14 are stacked and wound. Thus, this electrode winding apparatus 100 can be realized with a simple configuration in terms of equipment.

In this electrode winding apparatus 100, the strip-shaped separator 14 is semitransparent, as illustrated in FIGS. 2 and 7. This allows the imaging device unit 21 to photograph the strip-shaped separator 14 and also the strip-shaped electrode 13 through the strip-shaped separator 14, at a location where the strip-shaped electrode 13 and the strip-shaped separator 14 are stacked and wound. Moreover, this electrode winding apparatus 100 enables the detection at the portion q3, in which the first strip-shaped electrode 11 and the first strip-shaped separator 12 are stacked and wound, and at the portion q4, in which the second strip-shaped electrode 13 and the second strip-shaped separator 14 are stacked and wound. Detection at these portions q3, q4 is impossible with the edge detecting means. Moreover, the electrode winding apparatus 100 can directly and accurately detect the both widthwise edges 11f, 11g, 13f, 13g of the coated portions 11a, 13a of the strip-shaped electrodes 11, 13 and the both widthwise edges 12a, 12b, 14a, 14b of the strip-shaped separators 12, 14 that are stacked. As a result, this electrode winding apparatus 100 can prevent winding displacement between the strip-shaped electrodes 11, 13 and the strip-shaped separators 12, 14 more reliably. Thus, the difference (b–a) and the difference ((c1, c2)–b) can be made small, as shown in FIG. 1. Furthermore, since the difference (b–a) and the difference ((c1, c2)–b) can be made small, manufacturing costs (especially the material costs of the strip-shaped electrodes and the strip-shaped separators) can be reduced correspondingly.

The electrode winding apparatus, the method of detecting displacement between a strip-shaped electrode and a strip-shaped separator, the method of measuring the displacement amount, the method of correcting the displacement amount, and the electrode winding method according to one embodiment of the present invention have been described hereinabove. However, it should be noted that the present invention is not limited to the embodiments described hereinabove.

For example, the electrode winding apparatus is not limited to the apparatus for stacking in sequence and winding the first strip-shaped electrode, the first strip-shaped separator, the second strip-shaped electrode, and the second strip-shaped separator as described in the foregoing embodiment. The present invention is applicable to various electrode winding apparatuses for stacking and winding a strip-shaped electrode and a strip-shaped separator. In this case, the strip-shaped separator may desirably be semitransparent, and the electrode winding apparatus may desirably have an imaging device for photographing the strip-shaped separator and the strip-shaped electrode through the strip-shaped separator at a location where the strip-shaped electrode and the strip-shaped separator are stacked and wound.

The foregoing embodiment has illustrated, as an example, an apparatus for stacking in sequence and winds the first strip-shaped electrode 11, the first strip-shaped separator 12, the second strip-shaped electrode 13, and the second strip-shaped separator 14. Although not illustrated in the drawings, the strip-shaped positive electrode 11 and the strip-shaped negative electrode 13 may be interchanged. In this case, the strip-shaped positive electrode may desirably be photographed through the strip-shaped separator.

In the foregoing photographing step, the strip-shaped electrode 13 and the strip-shaped separator 14 are photographed in a state in which they are stacked to a degree such that the strip-shaped electrode 13 can be photographed through the strip-shaped separator 14. As described above, the strip-shaped electrode 13 and the strip-shaped separator 14 may desirably be photographed in a state in which they are completely stacked together. However, the strip-shaped electrode 13 and the strip-shaped separator 14 may be photographed in such a state that there is a gap therebetween, as long as the strip-shaped electrode 13 is photographed the strip-shaped separator 14. Furthermore, the required background, the color of the semitransparent strip-shaped separator 14, the color and brightness of illumination, and so forth may be selected appropriately so that there will be a difference between the background, the color of the semitransparent strip-shaped separator 14, and the color of the strip-shaped electrode 13 photographed through the strip-shaped separator 14. Although various modified examples have been illustrated hereinabove, the modified examples of the present invention are not limited to those illustrated herein.

INDUSTRIAL APPLICABILITY

According to a configuration of the present invention, an electrode winding apparatus for stacking and winding a strip-shaped electrode and a strip-shaped separator can be provided.

The invention claimed is:

1. An electrode winding apparatus for stacking and winding a strip-shaped electrode and a semitransparent strip-shaped separator, comprising:
    a winding shaft configured to wind the strip-shaped electrode and the strip-shaped separator;
    a guide member configured to stack the strip-shaped electrode and the strip-shaped separator before the strip-shaped electrode and the strip-shaped separator are wound around the winding shaft; and
    an imaging device, disposed so as to photograph a portion in which the strip-shaped electrode and the strip-shaped separator are stacked between the guide member and the winding shaft from a side on which the strip-shaped separator is stacked, and configured to photograph the strip-shaped separator and the strip-shaped electrode through the strip-shaped separator.

2. The electrode winding apparatus according to claim 1, wherein:
    the strip-shaped electrode has a coated portion in which an electrode material is coated off-centeredly toward one widthwise side of a strip-shaped sheet, and an uncoated portion in which no electrode material is coated in an edge portion at a widthwise opposite side of the strip-shaped sheet;
    the strip-shaped electrode and the strip-shaped separator are stacked so that the coated portion of the strip-shaped electrode does not stick out from the strip-shaped separator and the uncoated portion sticks out from the strip-shaped separator; and
    the imaging device is disposed so as to photograph an edge of the strip-shaped separator and an edge of the coated portion of the strip-shaped electrode.

3. The electrode winding apparatus according to claim 1, further comprising:
    a correction mechanism configured to correct displacement of the strip-shaped electrode and the strip-shaped separator; and
    a control unit configured to control the correction mechanism,
    the control unit configured to detect a displacement amount between the strip-shaped separator and the strip-shaped electrode based on an image photographed by the imaging device, and
    the control unit configured to control the correction mechanism so as to correct the displacement of the strip-shaped separator and the strip-shaped electrode based on the detected displacement amount.

4. An electrode winding apparatus for stacking in sequence and winding a first strip-shaped electrode, a first strip-shaped separator, a second strip-shaped electrode, and a second strip-shaped separator around a winding shaft, comprising:
    a first imaging device configured to photograph widthwise displacement of the first strip-shaped electrode and the first strip-shaped separator at a portion in which the first strip-shaped electrode and the first strip-shaped separator are stacked and wound;
    a guide member configured to stack the strip-shaped electrode and the strip-shaped separator before the strip-shaped electrode and the strip-shaped separator are wound around the winding shaft, the strip-shaped separator being semitransparent; and
    a second imaging device, disposed so as to photograph a portion in which the second strip-shaped electrode and the second strip-shaped separator are stacked between the guide member and the winding shaft from a side on which the second strip-shaped separator is stacked, and configured to photograph the second strip-shaped separator and the second strip-shaped electrode through the strip-shaped separator.

5. The electrode winding apparatus according to claim 4, wherein:
    each of the first strip-shaped electrode and the second strip-shaped electrode has a coated portion in which an electrode material is coated off-centeredly toward one widthwise side of a strip-shaped sheet, and an uncoated portion in which no electrode material is coated in an edge portion at a widthwise opposite side of the strip-shaped sheet;
    the first strip-shaped electrode and the strip-shaped separator as well as the second strip-shaped electrode and the strip-shaped separator are stacked so that the coated portion does not stick out from the strip-shaped separator and the uncoated portion sticks out from the strip-shaped separator;
    the first imaging device is disposed so as to photograph an edge of the first strip-shaped separator and an edge of the coated portion of the first strip-shaped electrode; and
    the second imaging device is disposed so as to photograph an edge of the second strip-shaped separator and an edge of the coated portion of the second strip-shaped electrode.

6. The electrode winding apparatus according to claim 4, further comprising:
    a first correction mechanism configured to correct displacement of the first strip-shaped electrode and the first strip-shaped separator;
    a second correction mechanism configured to correct displacement of the second strip-shaped electrode and the second strip-shaped separator; and
    a control unit configured to control the first correction mechanism and the second correction mechanism, wherein
    the control unit executes:
    a first control process of detecting a displacement amount between the first strip-shaped electrode and the first strip-shaped separator based on an image photographed by the first imaging device, and controlling the first correction mechanism so as to correct the displacement between and the first strip-shaped electrode and the first strip-shaped separator based on the displacement amount; and
    a second control process of detecting a displacement amount between the second strip-shaped electrode and the second strip-shaped separator based on an image photographed by the second imaging device, and controlling the second correction mechanism so as to correct the displacement between and the second strip-shaped electrode and the second strip-shaped separator based on the displacement amount.

7. The electrode winding apparatus according to claim 4, wherein the control unit executes a third control process of detecting a displacement amount between the first strip-shaped electrode and the second strip-shaped electrode based on images photographed by the first imaging device and the second imaging device, and controlling the first correction mechanism and the second correction mechanism so as to correct displacement between the first strip-shaped electrode and the second strip-shaped electrode based on the detected displacement amount.

* * * * *